(12) United States Patent
Cunha et al.

(10) Patent No.: US 10,344,979 B2
(45) Date of Patent: Jul. 9, 2019

(54) COOLING FLOW FOR LEADING PANEL IN A GAS TURBINE ENGINE COMBUSTOR

(71) Applicant: UNITED TECHNOLOGIES CORPORATION, Farmington, CT (US)

(72) Inventors: Frank J. Cunha, Avon, CT (US); Timothy S. Snyder, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 374 days.

(21) Appl. No.: 15/108,107

(22) PCT Filed: Jan. 9, 2015

(86) PCT No.: PCT/US2015/010716
§ 371 (c)(1),
(2) Date: Jun. 24, 2016

(87) PCT Pub. No.: WO2015/116360
PCT Pub. Date: Aug. 6, 2015

(65) Prior Publication Data
US 2016/0327273 A1    Nov. 10, 2016

Related U.S. Application Data

(60) Provisional application No. 61/933,487, filed on Jan. 30, 2014.

(51) Int. Cl.
*F23R 3/06* (2006.01)
*F23R 3/00* (2006.01)
(Continued)

(52) U.S. Cl.
CPC .............. *F23R 3/06* (2013.01); *F02C 3/14* (2013.01); *F23M 5/085* (2013.01); *F23R 3/005* (2013.01);
(Continued)

(58) Field of Classification Search
CPC .. F23R 3/00; F23R 3/002; F23R 3/007; F23R 3/04; F23R 3/06; F23R 3/10; F23R 3/12;
(Continued)

(56) References Cited

U.S. PATENT DOCUMENTS 4,361,010 A * 11/1982 Tanrikut ............... F23R 3/002
60/757
4,896,510 A    1/1990 Foltz
(Continued)

FOREIGN PATENT DOCUMENTS

| EP | 2549188 A2 | 1/2013 |
|---|---|---|
| WO | 2015084444 A1 | 6/2015 |
| WO | 2015122950 A2 | 8/2015 |

OTHER PUBLICATIONS

Supplementary European Search Report for European Application No. 15742909.3 dated Jan. 27, 2017.
(Continued)

*Primary Examiner* — William H Rodriguez
(74) *Attorney, Agent, or Firm* — Carlson, Gaskey & Olds, P.C.

(57) ABSTRACT

A heat resistant panel has a bulkhead and a swirler adjacent a combustion chamber. The heat resistant panel comprises an inner panel for facing the combustion chamber and defining a first exit port at an upstream end thereof configured to direct cooling air into the combustor chamber in a first direction adjacent the bulkhead. A second exit port at a downstream end thereof is configured to direct cooling air into the combustor chamber in a second direction with an
(Continued)

axial direction defined between the upstream and downstream ends. The first and second directions have opposed axial components. A heat resistant structure and a combustor are also disclosed.

6 Claims, 3 Drawing Sheets

(51) Int. Cl.
*F02C 3/14* (2006.01)
*F23M 5/08* (2006.01)
*F23R 3/14* (2006.01)
*F23R 3/58* (2006.01)

(52) U.S. Cl.
CPC ............ *F23R 3/007* (2013.01); *F23R 3/14* (2013.01); *F23R 3/58* (2013.01); *F05D 2210/33* (2013.01); *F05D 2220/32* (2013.01); *F05D 2240/35* (2013.01); *F23R 2900/03042* (2013.01); *F23R 2900/03043* (2013.01); *F23R 2900/03044* (2013.01); *F23R 2900/03045* (2013.01); *Y02T 50/675* (2013.01)

(58) Field of Classification Search
CPC .................. F23R 3/14; F23R 3/58; F23R 2900/03041–03045
See application file for complete search history.

(56) References Cited

U.S. PATENT DOCUMENTS

| | | | |
|---|---|---|---|
| 5,165,226 A | 11/1992 | Newton et al. | |
| 5,542,246 A | 8/1996 | Johnson et al. | |
| 5,775,108 A | 7/1998 | Ansart et al. | |
| 6,029,455 A | 2/2000 | Sandelis | |
| 7,770,397 B2 | 8/2010 | Patel et al. | |
| 8,256,223 B2 | 9/2012 | Dierberger et al. | |
| 8,418,470 B2 | 4/2013 | Burd | |
| 8,505,306 B2 | 8/2013 | Dierberger et al. | |
| 9,194,585 B2 * | 11/2015 | Cunha | F02C 7/18 |
| 2003/0213250 A1 | 11/2003 | Pacheco-Tougas et al. | |
| 2005/0022531 A1* | 2/2005 | Burd | F23R 3/002 |
| | | | 60/752 |
| 2005/0042076 A1 | 2/2005 | Baule et al. | |
| 2005/0086940 A1 | 4/2005 | Coughlan, III et al. | |
| 2006/0042263 A1 | 3/2006 | Patel et al. | |
| 2006/0207259 A1* | 9/2006 | Holt | F23M 5/085 |
| | | | 60/772 |
| 2007/0062202 A1* | 3/2007 | Stastny | F23R 3/60 |
| | | | 60/796 |
| 2007/0245742 A1 | 10/2007 | Dahlke et al. | |
| 2008/0264065 A1* | 10/2008 | Gerendas | F23R 3/002 |
| | | | 60/754 |
| 2009/0077974 A1* | 3/2009 | Dahlke | F23M 5/02 |
| | | | 60/752 |
| 2009/0100838 A1* | 4/2009 | Carlisle | F23R 3/002 |
| | | | 60/752 |
| 2010/0095679 A1* | 4/2010 | Rudrapatna | F23R 3/005 |
| | | | 60/752 |
| 2011/0185737 A1* | 8/2011 | Dierberger | F23M 5/02 |
| | | | 60/752 |
| 2011/0185740 A1* | 8/2011 | Dierberger | F23M 5/02 |
| | | | 60/755 |
| 2012/0234013 A1* | 9/2012 | Overman | F23C 9/006 |
| | | | 60/772 |
| 2013/0000309 A1* | 1/2013 | Dierberger | F23R 3/002 |
| | | | 60/752 |
| 2013/0019603 A1* | 1/2013 | Dierberger | F23R 3/002 |
| | | | 60/772 |
| 2013/0019604 A1* | 1/2013 | Cunha | F23N 5/16 |
| | | | 60/772 |
| 2013/0025287 A1* | 1/2013 | Cunha | F23R 3/002 |
| | | | 60/772 |
| 2013/0078582 A1* | 3/2013 | Pidcock | F23R 3/04 |
| | | | 431/12 |
| 2015/0292741 A1* | 10/2015 | Cunha | F23R 3/002 |
| | | | 60/752 |
| 2015/0362192 A1* | 12/2015 | Cunha | F23R 3/002 |
| | | | 60/772 |
| 2015/0369490 A1* | 12/2015 | Cunha | F23R 3/002 |
| | | | 60/752 |
| 2016/0201909 A1* | 7/2016 | Bangerter | F02C 3/14 |
| | | | 60/772 |
| 2016/0201913 A1* | 7/2016 | Tu | F23R 3/06 |
| | | | 60/755 |
| 2016/0265774 A1* | 9/2016 | Cunha | F23M 5/085 |
| 2016/0265775 A1* | 9/2016 | Cunha | F23M 5/00 |
| 2016/0273772 A1* | 9/2016 | Cunha | F23R 3/06 |
| 2017/0159935 A1* | 6/2017 | Drake | F23R 3/002 |
| 2017/0159936 A1* | 6/2017 | Cunha | F23R 3/002 |
| 2017/0356653 A1* | 12/2017 | Bagchi | F23R 3/002 |

OTHER PUBLICATIONS

The International Search Report and Written Opinion for PCT Application No. PCT/US2015/010716, dated Apr. 17, 2015.
International Preliminary Report on Patentability for International Application No. PCT/US2015/010716 dated Aug. 11, 2016.

* cited by examiner

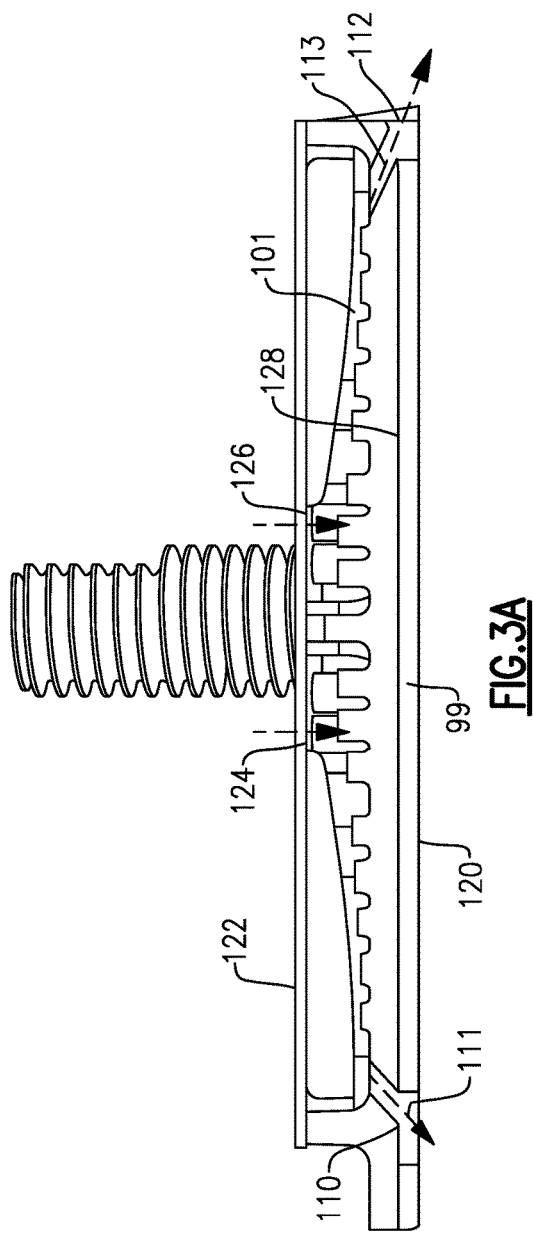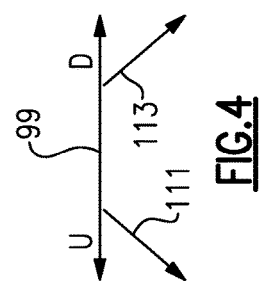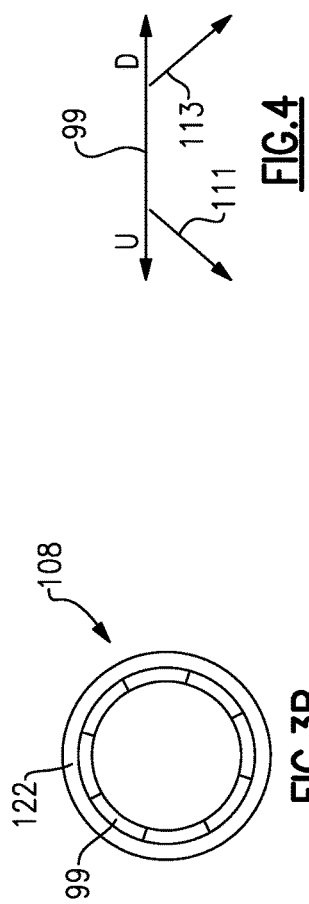

COOLING FLOW FOR LEADING PANEL IN A GAS TURBINE ENGINE COMBUSTOR

CROSS-REFERENCE TO RELATED APPLICATION

This application claims priority to U.S. Provisional Patent Application No. 61/933,487, filed Jan. 30, 2014.

BACKGROUND OF THE INVENTION

This application relates to a cooling scheme for use in cooling a panel adjacent an upstream end of a gas turbine engine combustor.

Gas turbine engines are known and may include a fan delivering air into a bypass duct as propulsion air. The fan also delivers air into a core engine where it passes to a compressor. Air is compressed in the compressor and passes into a combustor section. That air is mixed with fuel and ignited in the combustion section. Products of the combustion pass downstream over turbine rotors driving them to rotate.

The combustor is provided with heat resistant panels to protect the components from the very high temperatures generated by the combustor.

A swirler is also mounted within a bulkhead adjacent an upstream end of the combustor and provides a mixture of air and fuel into a combustion chamber and carries a flame once ignited.

Panels are positioned immediately downstream of the swirler and have typically been provided with cooling air. The cooling air has typically provided skin cooling to an inner surface of the panel.

The swirler results in the air and fuel swirling in coherent directions. The cooling air tends to intermix with these swirled fluids often in a distinct direction from the swirled fluids.

SUMMARY OF THE INVENTION

In a featured embodiment, a heat resistant panel for use in a combustor of a gas turbine engine has a bulkhead and a swirler adjacent a combustion chamber. The heat resistant panel comprises an inner panel for facing the combustion chamber and defining a first exit port at an upstream end thereof configured to direct cooling air into the combustor chamber in a first direction adjacent the bulkhead. A second exit port at a downstream end thereof is configured to direct cooling air into the combustor chamber in a second direction with an axial direction defined between the upstream and downstream ends. The first and second directions have opposed axial components.

In another embodiment according to the previous embodiment, the liner panel defines no cooling holes between the first and second exit ports.

In another embodiment according to any of the previous embodiments, the exit ports are configured to direct cooling air in the first and second directions consistent with a circulation of fluids exiting the swirler when the inner panel is positioned adjacent the bulkhead.

In another featured embodiment, a heat resistant structure for use in a combustor of a gas turbine engine has a bulkhead and a swirler adjacent a combustion chamber. The heat resistant structure comprises an outer frame. A plurality of inner panels, each inner panel for facing the combustion chamber and defining a first exit port at an upstream end thereof configured to direct cooling air into the combustion chamber in a first direction adjacent the bulkhead, and a second exit port at a downstream end thereof configured to direct cooling air into the combustion chamber in a second direction with an axial direction defined between the upstream and downstream ends. The first and second directions have opposed axial components.

In another embodiment according to the previous embodiment, the panels are configured to direct air in the first and second directions consistent with a circulation of fluids exiting the swirler when the panels are positioned adjacent the bulkhead.

In another embodiment according to any of the previous embodiments, the inner panels define no cooling holes between the first and second exit ports.

In another embodiment according to any of the previous embodiments, there is at least one supply port extending through the outer frame to supply the cooling air for impinging on an outer face of the inner panels.

In another embodiment according to any of the previous embodiments, a combustor comprises a bulkhead. A swirler is mounted in the bulkhead adjacent a combustion chamber. A heat resistant structure includes an outer frame and a plurality of inner panels. The inner panels face a combustion chamber. Each inner panel defines a first exit port at an upstream end thereof configured to direct cooling air into the combustion chamber in a first direction adjacent the bulkhead. A second exit port at a downstream end thereof is configured to direct cooling air into the combustion chamber in a second direction with an axial direction defined between the upstream and downstream ends. The first and second directions have opposed axial components.

In another embodiment according to any of the previous embodiments, the exit ports are configured to direct air in the first and second directions consistent with a circulation of fluids exiting the swirler when the panels are positioned adjacent the bulkhead.

In another embodiment according to any of the previous embodiments, the inner panels define no cooling holes between the first and second exit ports.

In another embodiment according to any of the previous embodiments, there is at least one supply port extending through the outer frame to supply the cooling air for impinging on an outer face of the inner panels.

In another embodiment according to any of the previous embodiments, the bulkhead is adjacent the first exit port.

In another embodiment according to any of the previous embodiments, the combustor defines a gap between an exit port at the upstream end of the inner panels and the bulkhead.

In another embodiment according to any of the previous embodiments, there is at least one supply port extending through the outer frame to supply the cooling air for impinging on an outer face of the inner panels.

In another embodiment according to any of the previous embodiments, a downstream heat resistant structure has an inner panel facing the combustion chamber, and film cooling holes formed through the inner panel in the downstream heat resistant structure.

In another embodiment according to any of the previous embodiments, the bulkhead is adjacent the first exit port.

In another embodiment according to any of the previous embodiments, the gap prevents film cooling of the bulkhead.

In another embodiment according to any of the previous embodiments, the bulkhead is adjacent the first exit port.

In another embodiment according to any of the previous embodiments, a downstream heat resistant structure has an inner panel facing the combustion chamber, and film cooling holes formed through the inner panel.

In another embodiment according to any of the previous embodiments, the cooling holes of the inner panel of the downstream heat resistant structure include an upstream cooling hole, a downstream cooling hole, and at least one cooling hole between the upstream and downstream cooling holes.

These and other features may be best understood from the following drawings and specification.

BRIEF DESCRIPTION OF THE DRAWINGS

FIG. 3A shows a detail of a panel incorporated in the combustor section of FIG. 2.
FIG. 3B shows a heat resistant structure.
FIG. 4 shows a flow diagram.

DETAILED DESCRIPTION

Figure 1:
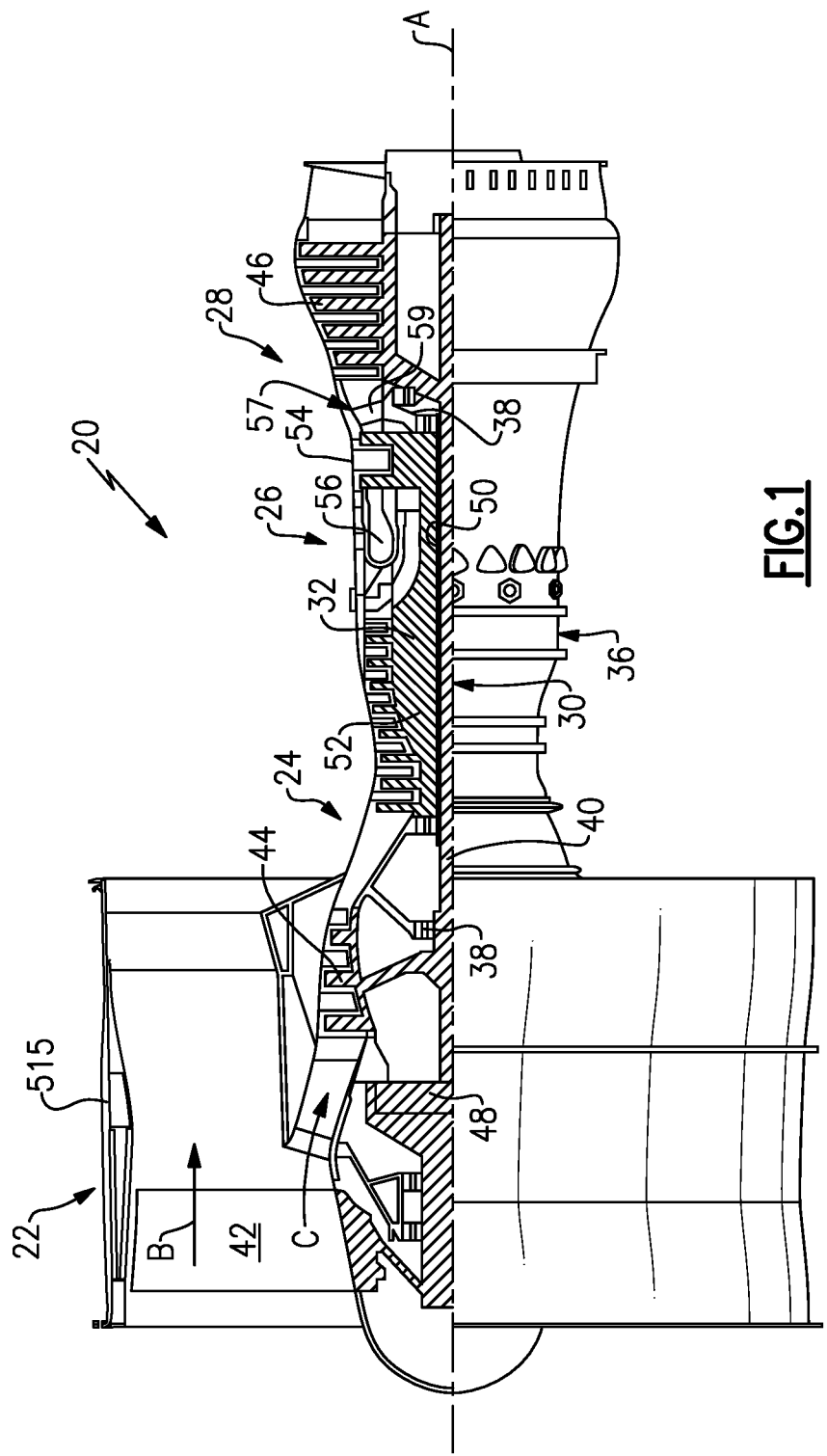
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 515, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Heat resistant panels included in combustors near fuel air swirlers have generally been provided with film cooling holes that direct cooling air outwardly in the path of swirling air and fuel. Collisions occur between nitrogen and oxygen atoms in the cooling air, and generate $NO_x$ impurities. It is a goal of modern gas turbine engine design to reduce the amount of $NO_x$ emissions generated during the combustion process.

Figure 2:
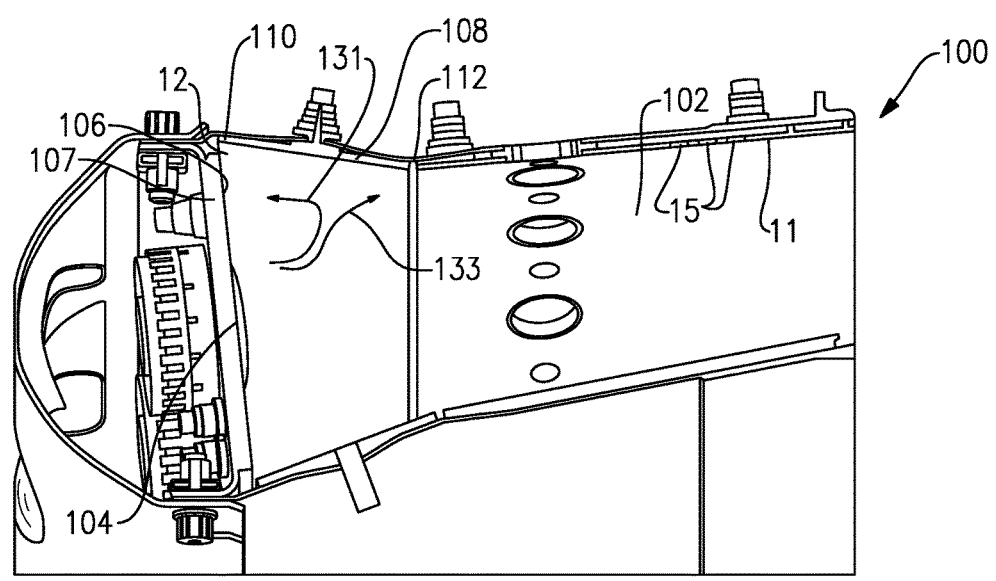
FIG. 2 shows a combustor section.

FIG. 2 shows a combustor section 100 defining a combustion chamber 102 (e.g., defined by combustor 56) that may be used in the engine 20 of FIG. 1. A swirler 104 injects fuel and air into the combustion chamber 102. The swirler 104 is mounted within a bulkhead 107 having a front face 106. Heat resistant structure 108 provides heat resistance to protect an outer surface of the combustor. Heat resistant structure 108 is mounted adjacent swirler 104.

As shown in FIG. 3A, each heat resistant structure 108 includes a plurality of panels 99 having an upstream end 110 and a downstream end 112. As shown, cooling air exits through ports 113 at the downstream end 112, and the ports 111 at upstream end 110. In accordance with the present disclosure, the ports 111 and 113 extend in opposed directions such that air exiting downstream ports 113 passes in a downstream direction while the air exiting at the upstream ports 111 passes in an upstream direction. Additionally, no film cooling holes are defined in panel 99 between ports 111 and 113.

As shown in FIG. 2, downstream panels 11 are provided with film cooling holes 15.

As shown schematically in FIG. 3B, the heat resistant structure 108 includes an outer frame 122 that may extend generally as a cylinder about a central axis of the combustion chamber, and a plurality of heat resistant liner panels 99 mounted to the outer frame 122.

An inner face 120 of an inner panel 99 is spaced from outer frame 122. Air supply ports 124 and 126 supply air which impacts against an outer face 128 of the panel 99 providing adequate cooling. The cooling air then flows in both upstream and downstream directions to exit at upstream ports 111 and downstream ports 113.

As best shown in FIG. 2, a gap 12 is defined between exit port 111 at the upstream end 110 of the panel 108 and a radially outer peripheral end of the bulkhead 107 (relative to engine axis A) such that there is some cooling of the bulkhead without film cooling the bulkhead.

The exit cooling air has a certain amount of momentum associated with it. This momentum can be represented by a magnitude and a direction. One can control its magnitude and direction by design. In one application, the direction is designed to be against the bulkhead 107 for the panel upstream exit 110. Therefore, there will be some local cooling on the bulkhead 107 due to the impact of this cooling jet. The direction of the air can be controlled when creating film holes by lasering, to guide the air flow penetration and direction towards the burner.

In addition to this local cooling by discharge jets from the panels, the bulkhead 107 is effectively cooled by back-side impingement jets.

Every time air is introduced in the burner, there are many collisions at the molecular level. To transform mixing arrangements into chemical reactions, temperature plays a key enabling role. If the air is directed towards the bulkhead 107 along standing circulation cells, in a coherent manner, then the potential for collision decreases. Since the air stream maintains an otherwise relative lower temperature, the potential for scavenging nitrogen for NOx formation is reduced.

As discussed above, the combustor section 100 has a main swirler 104 at an upstream end and heat resistant panels 99 facing combustor chamber 102 downstream of the main swirler 104. The heat resistant structure 108 includes inner panels 99 and an outer frame 122. Cooling air impinges air on an outer face 128 of the inner panel 99. The cooling air passes through exit ports at an upstream end 111 of the heat resistant panel and at a downstream end 113. An axial direction is defined along the combustion panel, such that air exiting at the upstream ports 111 passes in a direction having an axial component in an upstream direction, and the air exiting the panel at the downstream end 113 exits in a direction having an axial component in a downstream direction.

FIG. 4 graphically shows the flow directions of air exiting ports 111 and 113. An axial direction is defined along the panel 99 by arrow U-D, which also represent upstream and downstream directions. The direction of air exiting upstream ports 111 has a radial component and an axial component in the upstream direction. The air exiting downstream ports 113 is in a direction having a radial component and an axial component in a downstream direction. The axial components could be said to be opposed, although that term should not be interpreted to mean equal.

The fluids from swirler 104, which may include fuel and intermixed air, swirl in distinct directions as shown at 131 and 133. A portion 131 heads back upstream and, thus, the air exiting the upstream ports 111 is generally moving in a direction having a similar axial component to the direction 131. Similarly, the downstream flow 133 of the intermixed fluids is generally in a direction having a similar axial direction as the air exiting the downstream ports 113. In this way, cooling air is not directed against the direction of the swirl, thus reducing nitrogen scavenging and NOx formation. In that sense, the cooling air flows in a direction coherent, or consistent, with the directions of flow of the intermixed fuel and air.

Due to this, there is a reduction in collision between the oxygen and nitrogen in the air and, thus, a reduction in $NO_x$ contaminants.

With the disclosed arrangement, the amount of pollutants generated by the combustion process is dramatically reduced.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A combustor comprising:
a bulkhead;
a swirler mounted in said bulkhead adjacent a combustion chamber;
an upstream heat resistant structure, said upstream heat resistant structure including an outer frame and a plurality of inner panels, the inner panels facing the combustion chamber, each inner panel defining a first exit port at an upstream end thereof configured to direct cooling air into the combustion chamber in a first direction adjacent the bulkhead, and a second exit port at a downstream end thereof configured to direct cooling air into the combustion chamber in a second direction with an axial direction defined between the upstream and downstream ends;
said bulkhead being adjacent said first exit port;
said combustor defines a gap between an exit port at said upstream end of said inner panels and said bulkhead;
a downstream heat resistant structure having an inner panel facing the combustion chamber, and film cooling holes formed through said inner panel,
said film cooling holes of the inner panel of the downstream heat resistant structure include an upstream film cooling hole, a downstream film cooling hole, and at least one intermediate film cooling hole between the upstream and downstream cooling holes; and
wherein the first and second directions have opposed axial components, such that said axial component of said first direction being in an upstream direction and said axial component of said second direction being in a downstream direction.

2. The combustor as set forth in claim 1, wherein the exit ports are configured to direct air in the first and second directions consistent with a circulation of fluids exiting the swirler when the panels are positioned adjacent the bulkhead.

3. The combustor as set forth in claim 1, wherein the inner panels define no cooling holes between the first and second exit ports.

4. The combustor as set forth in claim 1, wherein there is at least one supply port extending through said outer frame to supply said cooling air for impinging on an outer face of said inner panels.

5. The combustor as set forth in claim 1, wherein there is at least one supply port extending through said outer frame to supply said cooling air for impinging on an outer face of said inner panels.

6. The combustor as set forth in claim 1, wherein the gap prevents film cooling of said bulkhead.

* * * * *